Oct. 16, 1951 W. W. POTTER ET AL 2,571,288
MACHINE TOOL
Original Filed May 26, 1944 3 Sheets-Sheet 1

INVENTORS
WILLIAM WALLACE POTTER
ALFRED JOSEPH FULLER
BY
ATTORNEY

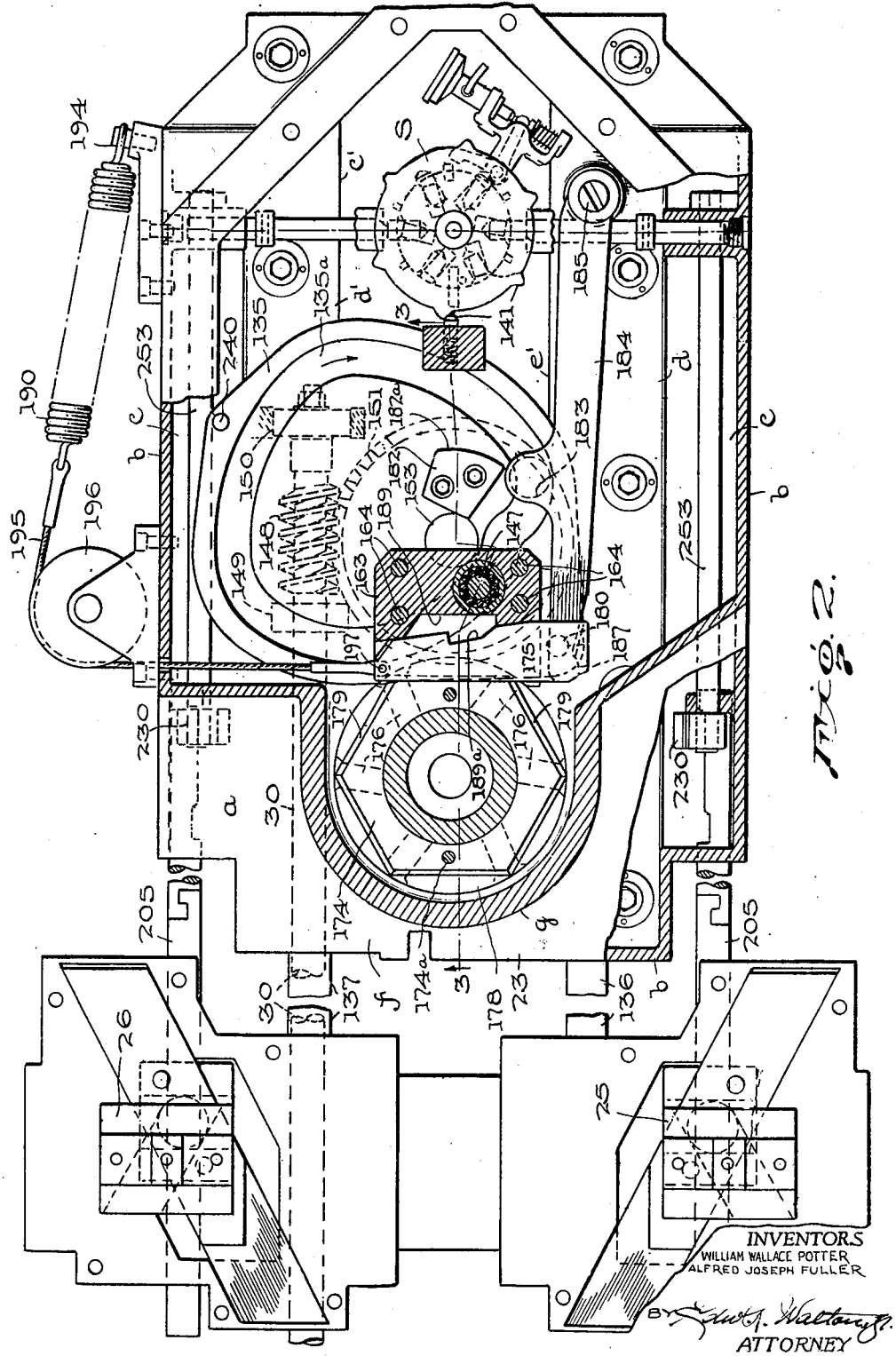

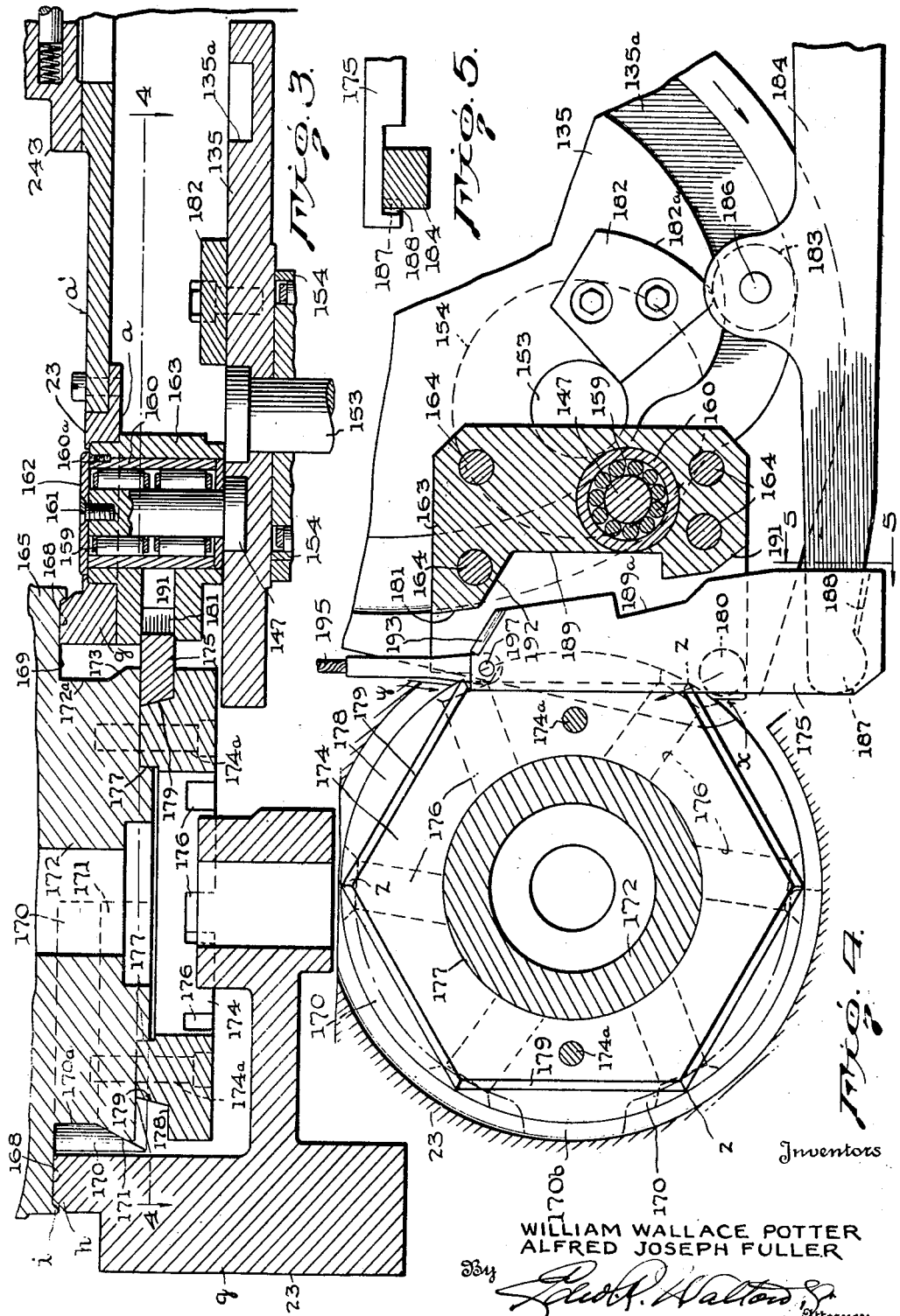

Patented Oct. 16, 1951

2,571,288

UNITED STATES PATENT OFFICE 2,571,288

MACHINE TOOL

William Wallace Potter and Alfred Joseph Fuller, Pawtucket, R. I., assignors, by mesne assignments, to Niles-Bement-Pond Company, West Hartford, Conn., a corporation of New Jersey Original application May 26, 1944, Serial No. 537,490, now Patent No. 2,455,876, dated December 7, 1948. Divided and this application March 25, 1946, Serial No. 656,928

18 Claims. (Cl. 29—50)

The present invention relates to machine tools and more particularly to an improved turret indexing mechanism therefor.

This application is a division of application Serial No. 537,490, filed May 26, 1944 now Patent No. 2,455,876, granted December 7, 1948.

One of the broad objects of the present invention is to effect a very compact, efficient and simplified construction, whereby the turret is unlocked, indexed and then locked through mechanism actuated by the turret-slide feeding or operating means.

More specifically, the objects of this invention are to provide—

(1) a wedge means movable into and out of effective position between a fixed abutment of the turret-slide and an opposing surface of the turret to lock and unlock the latter;

(2) means for indexing the turret and means synchronized with the indexing means for moving the wedge means out of locking position prior to indexing and to cause the same to move to locking position after the turret is indexed;

(3) a turret which rotatably rests in a bearing support and may be readily removed and reinserted in position when the locking wedge means is in ineffective position;

(4) a turret having a depending hub extending through a bearing support, the lower end of said hub having spaced radial grooves therein to receive successively a pin or the like for widening said turret a predetermined degree, said pin being actuated by the turret-slide feeding means;

(5) a turret-slide having a recess in its top surface and an annular turret support surface at the perimeter of said recess upon which support the turret rests for rotatable movement, a multi-faced turret having a depending hub portion extending into said recess and of less dimensions than said recess to permit lateral shifting movement of the hub therein, said hub having cylindrical circumferential portion, segmental bearing surface within said recess and extending for a distance around the inner wall thereof and complemental to cylindrical surface on the hub, means for indexing said turret, means positioned in opposition to said segmental bearing surfaces for binding said cylindrical portion of the hub against said segmental bearing surfaces to hold the turret in indexed position, said hub having polygonal surfaces corresponding to the turret faces, an abutment on the slide adjacent the turret and opposite the bearing surfaces of said recess, a wedge-lock plate normally biased to move between said abutment and one of the polygonal surfaces, whereby the turret is shifted on said perimetral support and the hub forced into clamping engagement with its complemental surfaces in the recess and the turret locked against movement, and means synchronized with the movement of said indexing means to withdraw said lock-plate from binding engagement between said abutment and a polygonal surface on the turret, thus permitting turret indexing and to release said lock-plate from unlocked position after indexing, thus permitting said lock-plate to move under the influence of its bias to locking position between said abutment and another polygonal surface on the said turret; and (6) other sundry details of construction, combination and sub-combination of parts hereinafter more fully set-forth in the following specification.

With the above objects in view, the invention resides in all that is shown and described herein and particularly pointed out in the appended claims.

In the drawings, which show the preferred embodiment of the invention as at present devised—

Figure 2 is a sectional view taken substantially on the line 2—2 of Figure 1 and illustrating, among other things, the turret-slide and the mechanism for locking and indexing the turret;

Figure 3 is a fragmentary longitudinal view of the turret-slide taken substantially on line 3—3 of Figure 2, to illustrate the turret mounting and the dials of the drive connection between the drive cam-disc and the turret-slide;

Figure 4 is a horizontal fragmentary sectional view taken substantially on line 4—4 of Figure 3 illustrating, somewhat enlarged, the turret locking mechanism in its unlocking position just prior to indexing movement of the turret; and Figure 5 is a fragmentary detail view showing the formation of the connection between the turret lock plate and its withdrawing means.

Throughout the specification and drawings, like characters of reference denote like and corresponding parts throughout the several views.

Figure 1:
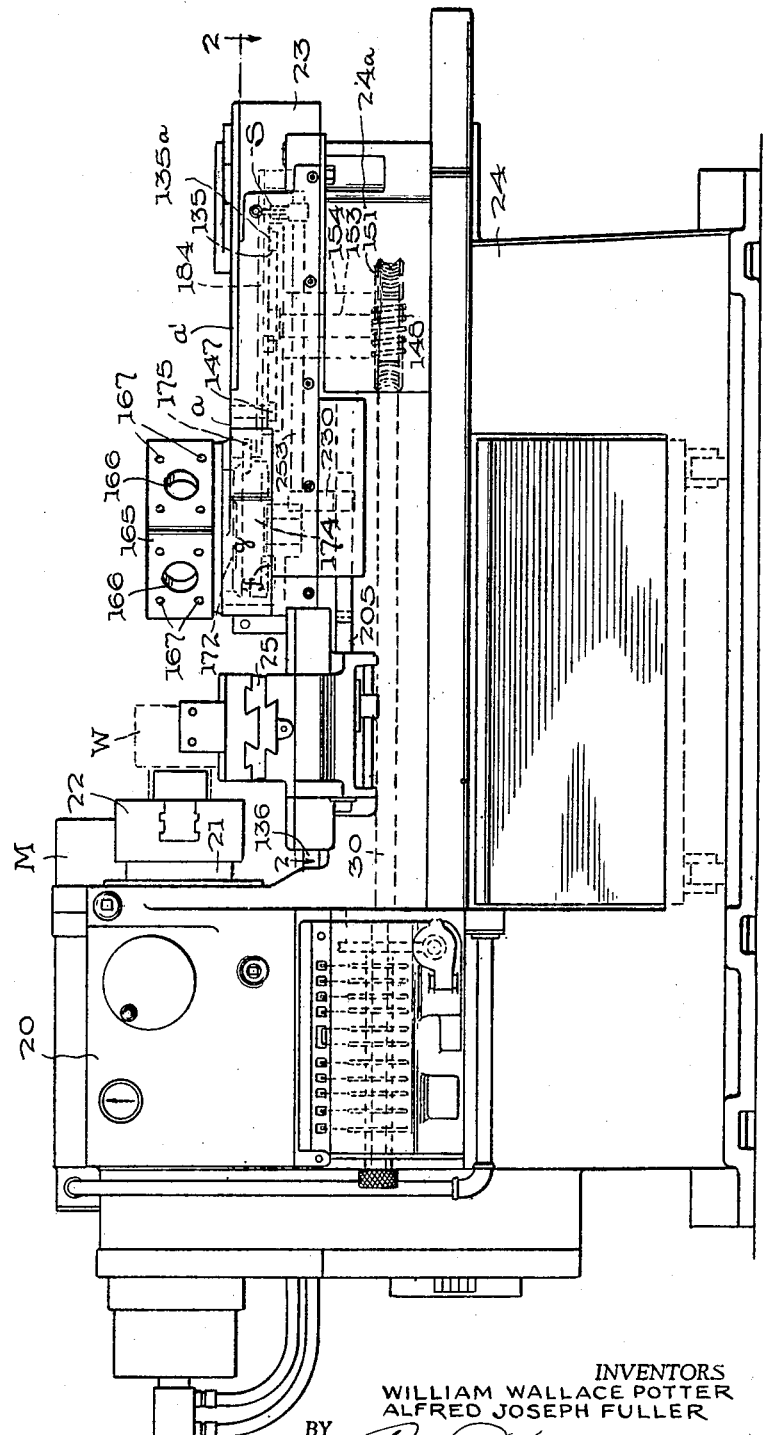
Figure 1 is a front side elevation of a machine tool equipped with the present invention.

In order that a better understanding may be had of the detailed description which follows, a general description will now be given of the machine tool, shown in Figure 1 of the drawings, as one type to which the invention may be applied.

This machine tool follows the general pattern of organizatiton of the various instrumentalities found in certain of the automatic turret lathes in that, it comprises a headstock 20 in which is disposed a horizontal work spindle 21 and the variable transmission unit of the machine, a chuck 22 carried on one end of the spindle in cooperative relation with a main slide 23 (which may be a turret slide) mounted on the bed 24 disposed at one side of the headstock 20 and reciprocable to and from the chuck 22 longitudinally of the spindle as well as with the front and rear cross slides 25 and 26, respectively, also mounted on the bed 24 between the chuck and the main slide for independent or simultaneous reciprocating movement at substantially right angles to the movement of the main slide. In this machine tool, the spindle 21 and feed shaft 30 (which latter operates, through various means, the main slides and the cross slides) are revolved at different speeds which are automatically selected, there being a driving connection between the spindle and feed shaft by which the rate of feed cutting movement of the tool slides is controlled by the spindle speed. Also, the idle movements of the tool slides toward and from the work are produced at a constant high speed; and the rotation of the spindle may be stopped, under certain conditions during such high speed idle movements of the tool slides, so that the workpiece W in the chuck will not revolve in order that tool marks on the work piece will not occur due to unintentional or accidental contact of the tools with the work during their fast idle motion. Furthermore, the change speed gearing, for varying the rate of rotation of the spindle and of the feed shaft, includes the clutches which are under control of a dog wheel, having a relatively slow peripheral motion, which releases free fast moving bodies that bring into action power-operated clutch-shifting mechanism to instantaneously shift the selected clutches. This instantaneous shifting of clutches is also particularly useful where it is desired to increase the speed of the spindle to compensate for reduction in cutting speed of the tools on the work, for instance, as the tool proceeds from the work piece periphery inwardly, thus enabling more rapid production of work by the machine under certain conditions as where facing cuts are now performed simultaneously with other cuts.

With the above brief general description, the detailed description of the improved mechanism employed by the present invention will now proceed.

*Tool slides*

As above stated, all movements of the main or turret slide 23 and the cross-slides 25 and 26 are actuated from the feed shaft 30 through a single disc-cam 135, which also indexes the turret 165 and actuates a cross-slide pre-selective device S that renders effective and ineffective the connections 205, 230 and 253 for actuating the cross-slides from the movement of the main slide.

*Turret and turret slide*

The main slide 23 is a flat box-like casting, as can be seen from Figures 1 and 2, providing a substantially flat top *a*, side and end walls *b*, with the bottom wall *c* slotted longitudinally of its movement, as at *c'*, with the marginal edge portions of said slot *c'* being formed into inverted channels *d* and *d'* to fit over and receive bearing rails 136 and 137, commonly called the "ways," disposed in parallel relation longitudinally of and on opposite sides of the bed-table 24*a* and parallel with the axis of the spindle 21. At least one of said channels, as shown at *d*, has opposing sidewalls which lie, respectively, on opposite sides of its rail 136. The ways 136 and 137 may be fastened to or form part of the bed of the machine.

As is common in most all turrent lathes, the turret 165 is rotatably mounted about a vertical axis upon the top surface *a* of the main slide 23 at its forward end—i. e., nearer the spindle 21 and in substantial axial alignment with the chuck 22 on the spindle 21. The turret 165 has a polygonal perimeter about its rotary axis to provide a predetermined number of substantially vertical faces having sockets and thread openings 166 and 167, respectively, for the attachment of tool or other holders, not shown. One or more tools, carried by each face, perform cutting operations at or about the same time upon the subject, to be machined, clamped in the chuck 22 on the rotating spindle 21 during part of the forward movement of the slide 23. There is one forward movement of the slide 23 for each face of the turret 165 in order to complete the cycle of the machine. The number of faces on the turret may vary according to the type of work to be performed by or the intended capacity of any particular machine. In the present showing, the turret 165 is shown as having six faces.

In order to provide for desired clearance, the top surface *a* of the turret-slide 23 is formed with a depressed offset forward end portion *f* and from the center of which rises an annular base *g* upon which the turret 165 is rotatably mounted (see Figs. 1 and 2).

As seen particularly from Figure 3, the top edge of the annular base *g* is provided by a reduced upstanding annular seat 168 flat on its upper surface, upon which latter is seated the flat surface of a complemental under-cut circular shoulder 169 near the bottom of the turret 165.

The under-cut shoulder 169 of the turret forms on the bottom face of the latter a reduced hub 172 having a cylindrical surface 172*a*, the lower or outer edge of which is outwardly flared to form the chamfered surface 173 of considerable less diameter than the inner circumference of the annular base *g*.

In order to center the turret, which is slightly shiftable laterally, on its annular base support *g*, a semi-circular inwardly projecting rib or boss 170 is disposed on the inner circumferential surface of the base *g*, near the seat 168 thereof, and extends (about 180°) around the side half of the base *g* nearest the spindle 21, the inner lower edge of said centering boss 170 being chamfered to provide an upwardly and outwardly inclined surface 171. The centering boss or rib 170 may be, and preferably is, interrupted or cut-away, as at 170*b* to provide a relief at a point opposite the spindle 21. The semi-circular inner surface 170*a* of the boss 170 and its inclined surface 171 are complemental to the cylindrical surface 172*a* of the hub 172 and its flared end surface 173, respectively, so as to contact and cooperate therewith for firmly centering the turret when the latter is locked in position by the wedge 175. As above stated, the dimensions of the hub 172 and its flared end portion 173 are less than the inner circumference of the annular turret supporting base *g* including the inner surface of the boss 170, so that the turret can be lifted out of position when the locking means 175 (later to be described) is removed from locking position.

The outer peripheral edge of the shoulder and bearing surface 169 of the turret has a downwardly extending lip *i* which overhangs the bearing surface 168 so as to exclude chips and dust from between said surfaces. The surface of the seat 168 opposing the lip *i* is cut-away, as at *h*, to provide clearance therebetween so as to allow the aforesaid slight lateral shifting movement of the turret.

Applied to the under surface of the turret and of a diameter no greater than the flared end 173 of the hub 172, is an index and lock disc-plate 174 in the form of an annulus secured to the hub by bolts 174a and is concentrically arranged on the hub. This member 174 cooperates with an indexing element 180 on the disc cam 135 for indexing the turret and with a wedge lock 175 for locking the turret in indexed positions. To this end, the under surface of the disc-plate 174 is provided with a plurality of grooves 176, one for each face of the turret and arranged in a somewhat radial manner, as particularly shown in Figures 3 and 4 with their outer ends open at the edge of the disc and positioned, preferably at points corresponding to the corners of the faces of the turret. These grooves 176 are actually arranged as in a chordal or radially offset manner, rather than being truly radial, in order to obtain easy leverage for revolving the turret when the indexing pin 180 on cam-disc 135 enters therein. The upper surface of the disc-plate 174 is reduced in diameter to provide a circular shoulder 178 with the perimetral surface of the reduced portion formed polygonally to correspond with the number of and the position of the turret faces, these polygonal surfaces 179 being upwardly and inwardly inclined to be engaged by a corresponding surface on the wedge-lock 175. Each surface 179 is chordal with reference to the perimeter of disc-plate 174, i. e. it is a plane perpendicular to a diameter of the turret axis.

*Turret slide cam, turret indexing and locking means*

The main or turret slide 23 is reciprocated on its ways 136 and 137, above described, to and fro with respect to the chuck 22 on the end of the spindle 21, by means of the horizontally disposed disc-cam 135 positioned within the slide 23 between its top surface *a* and its bottom wall *c* (see Figs. 1 and 2), and therefore above the ways 136 and 137. This disc-cam 135 is provided on its top surface with a substantially heart-shaped box-cam groove 135a into which extends a cam roll or follower 147 carried on the under face of the top side *a* of the slide 23 and disposed off center with respect to the longitudinal center line through the slide to reduce side pressure on the ways 136 and 137 for smooth operation of the slide, the cam rotating in the direction of the arrow shown in Figure 2.

As particularly shown in Figures 1 and 3, the disc-cam 135 is driven from a worm 148 on the feed shaft 30 which extends into the head-stock casing 20 and is mounted in bearings 149 and 150 (Fig. 2) disposed on opposite sides of the worm 148 and supported by the machine bed frame 24. The worm 148 drives a horizontally disposed worm wheel 151 on the same axis with the disc-cam 135 and operatively connected with said axis to rotate said cam by a shaft 153 and centering sleeve 154.

The roller follower 147 (Fig. 3), is preferably mounted in a roller bearing 159 whose bushing 160 is held against rotatable movement by a pin or screw 160a. By removing the screw 161, the retaining cap plate 162 may be removed—thus allowing bushing 160 and the roller follower 147 to be removed as a unit from its socket in a guide block 163 removably secured to the turret slide 23 by bolts 164 (Figs. 2 and 3) or formed as an integral part thereof, under its top surface *a* and behind the turret 165.

One revolution of the worm wheel 151, driven from the feed shaft 30, effects a corresponding revolution of the cam-disc 135 which causes one full reciprocating motion of the main slide 23 from its starting point toward the chuck and back to its starting point through the mechanism above described. In Figure 2, the parts are indicated as they approach the finish of the backward movement of the slide while, in Figures 3 and 4, the parts are shown at their starting point with the indexing of the turret about to take place. Before the indexing takes place, the turret wedge-lock 175 is withdrawn, as shown particularly in Figure 4.

This wedge-lock is supported in a horizontally slotted or bifurcated front face of the guide block 163, as at 181, with the bottom wall or crotch of the slot oblique with respect to a plane perpendicular to a diameter of the turret axis, as indicated in the drawings, to provide a wedge slot so that, as the wedge plate 175 slides in such slot longitudinally thereof and transversely of the machine and in a tangential direction relative to the turret disc-plate 174 under the action of a biasing spring 190 (Fig. 2) to locking position, its straight chamfered forward edge will bear against complemental chamfered surface 179 on the disc-plate 174, the opposite edge of the wedge plate being formed complemental to the bottom wall of the wedge slot 181. The guide block 163 therefore constitutes an abutment which backs up the wedge-lock when moved into locking position wherein it snugly fits the space between the block 163 and any one of the polygonal faces of turret disc-plate 174 which has been brought into position opposite block 163 by indexing of the turret.

Therefore, to withdraw the wedge-lock 175, the cam-disc 135 has secured to its upper surface a plate-cam 182 positioned so that, when the cam-disc 135 is in the position shown in Figure 4, the surface of the plate-cam immediately preceding the dwell portion 182a contacts roller 183 which rides up onto the dwell portion and in so doing moves lever 184 to withdraw the wedge lock 175 against tension of the spring 190 to the position shown in Figure 4 thereby releasing the turret 165 for indexing. Thereafter, the dwell portion 182a maintains lever 184 in its shifted position throughout a predetermined arc of movement of the cam-disc. The lever 184 is fulcrumed at one end to the rear end portion of the turret slide as at 185, Fig. 2, while the roller 183 is disposed intermediate the length of the lever 184 and is journalled on pin shaft 186 and the other end of the lever is formed with a radius end 187 extending into a correspondingly formed slot 188 at one end of the wedge-lock 175 to prevent the latter from getting out of position when being moved, as will be presently explained, by the corners of the polygonal surfaces 179 on the disc-plate 174 (see Figs. 4 and 5).

At this point, the cam-disc 135 has moved the turret indexing pin 180 to enter the outer end of one of the grooves 176 in the disc-plate 174 (as at *x* Figure 4) which groove has been brought to position to receive the indexing pin by a previous indexing of the turret, after the manner of a Geneva movement. Having entered the groove and continuing in its movement with cam-disc 135, the pin 180 indexes the turret 165 one position—i. e. moves the turret face opposite the chuck 22 (one-sixth of a revolution of the turret)—and, thus, brings the next succeeding turret face opposite the chuck 22, at which time the pin 180 leaves the groove at the point $y$ (Fig. 4).

During this indexing of turret 165, the wedge lock plate 175 is in the position shown in Figure 4, but, as the turret commences to turn on its axis, the corner $z$ on the disc-plate 174 (which is then at the point $x$) engages the wedge-lock 175 causing it to fulcrum on radius 187 at the end of lever 184 and swing into a pocket 189 formed in the bottom wall of the guide block 163, thereby allowing the corner $z$ to pass; otherwise, the wedge-lock would have to be withdrawn a greater distance requiring greater movement of operation parts, more clearance, etc., said swinging movement being permitted by cut-out 189a in wedge 175.

After the indexing pin has substantially completed the indexing of the turret or at least after the corner $z$ has completed more than half of its movement, the dwell 182a on the plate cam 182 releases the arm 184 to allow the biasing spring 190 to act upon the wedge lock 175 and move to its locking position, as shown in Figure 2. Angular surfaces 191 and 192 on the guide block 163 and angular surface 193 on the wedge-lock 175 prevent the latter from jamming in the pocket 189, when the lever 184 is released, and the biasing spring 190 becomes effective for moving the wedge-lock into locking position. When the position of the indexing pin 180 is such as to have brought the turret to its indexed position, the wedge-lock 175 is snapped into position wedging itself between the oblique bottom surface of the slot 181 and the opposing chamfered surfaces 179 on the disc-plate 174 secured to the bottom of the turret, thus forcing the forward surface of the hub 172 and its bevelled end 173 against the complemental surfaces 170a and 171 of the boss 170 (Fig. 3) thereby locating the turret in position and locking it upon its seat 168. The biasing spring 190 may be either a tension spring or compression spring suitably located on the machine, but for present purposes is shown as consisting of a tension spring secured at one end to the outer wall of the main slide 23 as at 194, its other end being connected to a cable 195 which passes over a pulley 196 and is secured to the wedge-lock-plate 175 as at 197.

Having thus described the invention in the manner in which it is to be performed, it is to be understood that the precise construction and arrangement shown and described is susceptible of modification and variation. Therefore, the invention in many respects has been claimed broadly so as to permit such variation and change and, in other instances, more specifically.

That which is claimed, as new, is:

1. In a machine tool having a turret slide, an indexable rotatable turret mounted on said slide and having a plurality of flat faces disposed about a perimeter of the turret, means for indexing the turret about its axis, means for locking and unlocking the turret in indexed position including a fixed abutment carried by said slide and adjacent to the turret and a lock member movable tangentially relative to the turret into and out of position between said abutment and an opposing one of the said flat faces on the turret whereby, when said member is moved to engage the abutment and a flat face on the turret, the turret is locked and, when moved out of engagement with said flat face, the turret is unlocked and free to rotate.

2. In a machine tool having a turret slide, an indexable rotatable turret mounted on said slide and having a hub portion provided with a plurality of flat side faces disposed perpendicular to diameters of the turret axis, means for indexing the turret, means for locking and unlocking the turret in indexed position including a fixed abutment adjacent to the turret and a lock member mounted for movement tangentially relative to said hub into and out of position between said abutment and an opposing one of said flat faces on the turret whereby, when said member is moved to engage the abutment and a flat face on the turret, the turret is locked and, when moved out of engagement with said flat face, the turret is unlocked and free to rotate, and means synchronized with the indexing means for moving said lock member out of locking position prior to indexing and to allow the same to be moved to locking position after the turret is indexed.

3. In a machine tool having a turret slide, said slide having a recess in its top surface and an annular supporting surface at the perimeter of said recess, a multi-faced turret removably resting on said annular support for rotation thereon and having a depending cylindrical hub portion extending into said recess, substantially semi-circular rib projecting within said recess from its circumferential surface and extending for a distance around the inner wall thereof and complemental to a cylindrical surface on the hub, said hub and recess being dimensioned so that the hub may be lifted from the recess past said rib, means for indexing said turret, and a turret locking device positioned opposite said rib relative to said hub to bind the turret in indexed position with said complemental surfaces of said hub and rib snugly abutting each other to center the turret accurately.

4. In a machine tool having a turret slide, a multi-faced turret carried on said slide and having a depending hub portion extending into said slide, the lower end of said hub having spaced radial grooves therein, a pin positioned to enter one of said grooves for indexing said turret at least one face, said hub having polygonal surfaces corresponding to the turret faces, an abutment on the slide adjacent the turret, a wedge lock-plate mounted to reciprocate tangentially of said hub between said abutment and one of the polygonal surfaces, biasing means normally maintaining said lock-plate in snug contact with said abutment and one of said surfaces to lock the turret in indexed position against movement, and mechanism synchronized with the movement of said indexing pin to withdraw said lock-plate from binding engagement between said abutment and a polygonal surface on the turret, thus permitting turret indexing, and to release said lock-plate from unlocked position after indexing.

5. In a machine tool having a turret slide, a multi-faced turret rotatably carried on said slide and having a depending hub portion extending into said slide, said hub having polygonal surfaces corresponding to the turret faces, the lower end of said hub having spaced radial grooves therein, a cam-disc having an operative connection with said slide for reciprocating said slide, a pin positioned on said cam-disc to enter one of said grooves for indexing said turret at least one face, and mechanism actuated from said cam-disc for unlocking the turret, prior to indexing, and for locking the turret after indexing, said mechanism including a wedge-plate mounted for and normally biased to move tangentially between an abutment and one of said polygonal surfaces on the hub to lock the turret against movement, a swingable arm having its distal end in pivotal engagement with one end of the wedge-plate and movable by a cam surface on said disc cam to withdraw the wedge-plate out of locking position during turret indexing.

6. In a machine tool having a turret slide, said slide having a recess in its top surface and an annular turret support surface at the perimeter of said recess upon which support the turret removably rests for rotatable movement, a multi-faced turret having a depending hub portion extending into said recess and of less dimensions than said recess to permit lateral shifting movement of the hub therein, said hub having a cylindrical circumferential portion, a segmental bearing surface within said recess and extending for a distance around the inner wall thereof and complemental to the cylindrical surface on the hub, means for indexing said turret, and means positioned in opposition to said segmental bearing surface for binding said cylindrical portion of the hub against said segmental bearing surfaces to hold the turret in indexed position.

7. In a machine tool having a turret slide, said slide having a recess in its top surface and an annular supporting surface at the perimeter of said recess, a multi-faced turret removably resting on said annular perimetral support and having a depending hub portion extending into said recess and of less dimensions than said recess to permit lateral shifting movement of the hub therein, said hub having a cylindrical circumferential portion provided with a circumferential and laterally extending chamfered lip at its lower end, a segmental bearing surface within said recess and extending for a distance around the inner wall thereof and complemental in shape to the cylindrical and chamfered lip surfaces on the hub, means for indexing said turret, and means positioned in opposition to said segmental bearing surfaces for binding said complemental surfaces on the hub and recess wall after said indexing to hold the turret in indexed position.

8. In a machine tool having a turret slide, said slide having a recess in its top surface and an annular turret support surface at the perimeter of said recess upon which support the turret rests for rotatable movement, a multi-faced turret having a depending hub portion extending into said recess and of less dimensions than said recess to permit lateral shifting movement of the hub therein, said hub having cylindrical circumferential portion, a segmental bearing surface within said recess and extending for a distance around the inner wall thereof and complemental to cylindrical surface on the hub, means for indexing said turret, said hub having polygonal surfaces corresponding to the turret faces, an abutment on the slide adjacent the turret and opposite the bearing surfaces of said recess, a wedge-lock plate normally biased to move between said abutment and one of the polygonal surfaces, whereby the turret is shifted on said annular support and the hub forced into clamping engagement with its complemental surface in the recess and the turret locked against movement, and means synchronized with the movement of said indexing means to withdraw said lock-plate from binding engagement between said abutment and a polygonal surface on the turret, thus permitting hub indexing.

9. A machine as set-forth in claim 8, wherein there is a cam-disc journalled in the bed of machine and disposed within the turret slide and having an operative connection with the slide for reciprocating said slide, and wherein said indexing means is a pin on a rotatable cam-disc and which engages in radial slots on the free end of the hub, and wherein the lock-plate withdrawing means includes a swingable arm having its distal in pivotal engagement with one end of the lock-plate and moved in one direction by a cam surface on said cam-disc.

10. In a machine tool having a turret slide, an indexible turret rotatably mounted on the slide and having a polygonally surfaced portion about its axis, an abutment on the slide adjacent said polygonally surfaced portion of the turret, and a wedge-lock plate positioned between the abutment and the turret for reciprocation in a path perpendicular to a diameter of the turret axis and adapted to contact said abutment and one of said surfaces on the turret, when in wedging position, for locking the turret against movement, means for moving the wedge-lock plate into locking position, and means for withdrawing the locking plate from wedging position, whereby the turret may be indexed.

11. In a machine tool having a turret slide, a multi-faced indexible turret rotatably mounted on the slide and having a polygonally surfaced portion about its axis corresponding to the turret faces, a stationary abutment on the slide adjacent the turret and having a wedge surface complemental to any one of the polygonal turret surfaces, and a wedge lock plate positioned between the abutment and the polygonally surfaced portion of said turret for reciprocation in a path perpendicular to a diameter of the turret axis and adapted to contact the wedge surface on said abutment and any one of said polygonal surfaces of the turret, when in wedging position, for centering and locking the turret against movement, means for moving the wedge lock plate into locking position, and means for withdrawing the locking plate from wedging position, whereby the turret may be indexed.

12. In a machine tool having a turret slide, a multi-faced indexible turret mounted on the slide and having polygonal surfaces corresponding to the turret faces, a stationary abutment on the slide adjacent the turret and having a wedge surface slightly oblique to a plane perpendicular to a diameter of the turret axis, and a wedge-lock plate positioned between the abutment and the turret for contacting the wedge surface on said abutment and any one of said polygonal surfaces on the turret, when in wedging position, to lock the turret against movement, means for moving the wedge-lock plate into locking position, means for partially withdrawing the wedge-lock plate from wedging position, whereby the turret may be indexed, the said abutment and wedge-lock plate having cut-out portions and projections of complementary form to allow the corresponding projection on the lock plate to enter the cut-out portion of the abutment, and conversely, when the lock plate reaches its partially withdrawn position to provide clearance when the turret is indexed.

13. In a machine tool having a turret slide, a multi-faced indexible turret mounted on the slide and having polygonal surfaces corresponding to the turret faces, a stationary abutment on the slide adjacent the turret and having a wedge surface slightly oblique to a plane perpendicular to a diameter of the turret axis, and a wedge-lock plate positioned between the abutment and the turret for contacting the wedge surface on said abutment and any one of said polygonal surfaces on the turret, when in wedging position, for locking the turret against movement, spring means normally urging the wedge-lock plate into locking position, means for partially withdrawing the lock plate from wedging position, whereby the turret may be indexed, the said abutment and wedge-lock plate having cut-out portions and projections of complementary form to allow the projections on the lock plate to be moved into the cut-out portion of the abutment, and conversely, when the lock-plate reaches its partially withdrawn position to provide clearance when the turret is indexed.

14. In a machine tool having a turret slide, ways upon which said slide is mounted for reciprocating movement, a multi-faced turret carried on the top surface of said slide and having a depending hub portion extending into said slide, the lower end of said hub having spaced substantially radial grooves therein, a disc-cam disposed between said ways and beneath said slide and having an operative connection with said slide to reciprocate said slide, a pin positioned on said cam to enter one of said grooves for indexing said turret at least one face, a wedge-shaped member pivotally mounted in said slide, means for moving said wedge-shaped member to unlock the turret, prior to indexing, and means to move said wedge-shaped member into contact with a surface of said turret and an opposing surface of the slide to lock the turret after indexing.

15. In a machine tool having a turret slide, a base, ways upon said base on which said slide is mounted for reciprocation, a multi-faced turret rotatably mounted on the top wall of said slide and having a depending hub portion extending into said slide, the lower end of said hub having spaced substantially radial grooves therein, a cam-disc disposed on a vertical axis and supported on said base within the turret slide and between the ways, a cam-follower on the top wall of the slide and in cooperative engagement with said disc-cam for reciprocating said slide, a pin positioned on said cam-disc to enter one of said grooves for indexing said turret at least one face, and a locking device actuated transversely within said slide from said cam-disc for unlocking the turret, prior to indexing, and means for moving said locking device into contact with a surface of said turret and an opposing surface of said slide to lock the turret after indexing.

16. In a machine tool having a base, a turret slide thereon, an indexible turret rotatably mounted on said slide, a rotatable, horizontally mounted disc-cam member in said base having an operative connection with the slide for reciprocating said slide, said cam having means thereon positioned to engage and index said turret, at least one position, when said cam and slide are in a predetermined position, and means for driving said cam member.

17. In a machine tool having a base, a turret slide thereon, an indexible turret rotatably mounted on said slide, including a part having spaced radial grooves therein, a rotatable, horizontally mounted disc-cam member in said base having an operative connection with the slide for reciprocating said slide and including pin means on said cam member to enter one of said grooves for indexing said turret, at least one position, when said cam and slide are in a predetermined position, and means for driving the cam member.

18. In a machine tool having a base, a turret slide thereon, an indexible turret rotatably mounted on said slide, a rotatable, horizontally mounted disc-cam member in said base having an operative connection with the slide for reciprocating said slide and including means positioned on the cam member to engage and index said turret, at least one position, when said cam and slide are in a predetermined position, and a transversely operable turret locking device on said slide having means actuated by a cam on said cam member for locking and unlocking the turret in indexed positions.

WILLIAM WALLACE POTTER.
ALFRED JOSEPH FULLER.

REFERENCES CITED

The following references are of record in the file of this patent:

UNITED STATES PATENTS

| Number | Name | Date |
|---|---|---|
| 1,511,447 | Drissner | Oct. 14, 1924 |
| 1,748,540 | Curtis | Feb. 25, 1930 |
| 2,273,844 | Drissner | Feb. 24, 1942 |
| 2,358,503 | Godfriaux | Sept. 19, 1944 |